United States Patent
Ruskin et al.

(10) Patent No.: US 7,858,874 B2
(45) Date of Patent: Dec. 28, 2010

(54) CONTINUOUS CIRCUIT OVERLAY SOLAR SHINGLES

(75) Inventors: Raymond Henry Ruskin, 3007 Ferndale St., Kensington, MD (US) 20895; Homan B. Kinsley, Bohannon, VA (US)

(73) Assignee: Raymond Henry Ruskin, Kensington, MD (US)

( * ) Notice: Subject to any disclaimer, the term of this patent is extended or adjusted under 35 U.S.C. 154(b) by 0 days.

(21) Appl. No.: 12/590,346

(22) Filed: Nov. 7, 2009

(65) Prior Publication Data

US 2010/0275534 A1   Nov. 4, 2010

Related U.S. Application Data

(63) Continuation-in-part of application No. 12/387,527, filed on May 4, 2009.

(51) Int. Cl.
*H01L 31/042* (2006.01)
*H01L 31/00* (2006.01)
*E04D 13/18* (2006.01)

(52) U.S. Cl. ..................... 136/244; 52/173.3
(58) Field of Classification Search ................. 52/173.3
See application file for complete search history.

(56) References Cited

U.S. PATENT DOCUMENTS

| | | | |
|---|---|---|---|
| 3,005,862 A * | 10/1961 | Escoffery | ................... 136/244 |
| 4,040,867 A | 8/1977 | Forestieri et al. | |
| 4,321,416 A | 3/1982 | Tennant | |
| 5,575,861 A | 11/1996 | Younan et al. | |
| 5,590,495 A | 1/1997 | Bressler et al. | |
| 6,875,914 B2 | 4/2005 | Guha et al. | |
| 7,155,870 B2 | 1/2007 | Almy | |
| 7,328,534 B2 | 2/2008 | Dinwoodie | |
| 2005/0022857 A1* | 2/2005 | Daroczi et al. | ............... 136/244 |
| 2009/0000221 A1 | 1/2009 | Jacobs et al. | |
| 2009/0000657 A1 | 1/2009 | Jacobs | |
| 2009/0095339 A1* | 4/2009 | Nightingale | ................. 136/244 |
| 2009/0133340 A1 | 5/2009 | Shiao et al. | |
| 2009/0133739 A1 | 5/2009 | Shiao et al. | |
| 2009/0133740 A1 | 5/2009 | Shiao et al. | |
| 2009/0159118 A1 | 6/2009 | Kalkanoglu et al. | |
| 2009/0178350 A1 | 7/2009 | Kalkanoglu et al. | |
| 2009/0194143 A1 | 8/2009 | Jacobs et al. | |

* cited by examiner

*Primary Examiner*—Jennifer K Michener
*Assistant Examiner*—Magali P Slawski

(57) ABSTRACT

A solar roofing system includes components that can be made to mimic traditional tabbed asphalt roofing shingles in size, shape, and performance. Additionally, the shingles also include photovoltaic devices embedded in the shingle tabs. Shingles are installed in a traditional manner using traditional tools and fasteners in offset and overlapping rows. Electrical connectivity among tabs is made by contact between top and bottom surfaces of shingles without the need for additional wiring or hardware. The system includes multiple shingle shapes including a variation that can be cut apart into separate tabs. This solar roofing system can be integrated with non-photovoltaic components to fit irregularities found in a variety of roof surfaces. The system, once installed, creates a redundancy of electrical connectivity throughout a roof surface to allow for interruptions and irregularities in the roof surface and to allow for highly reliable output performance.

23 Claims, 14 Drawing Sheets

CONTINUOUS CIRCUIT OVERLAY SOLAR SHINGLES

CROSS REFERENCE TO OTHER RELATED APPLICATIONS

This application is a Continuation in Part of patent application Ser. No. 12/387,527,filled on May 4, 2009.

FEDERALLY SPONSORED RESEARCH OR DEVELOPMENT

None.

BACKGROUND OF THE INVENTION

The idea of fitting new houses and re-fitting old houses with photovoltaic roofing or roof-mounted systems has been widely embraced as an environmentally beneficial goal, but one that still remains commercially illusive in the mass roofing market. There are several reasons for this.

First, the initial cost of installing such a system has not given consumers enough financial incentive in future returns to choose to install a home roof-mounted solar system. Therefore the technological focus has been primarily on greater photovoltaic efficiency. But, to date, the industry has yet to develop photovoltaic devices with enough efficiency to offset the other cost factors involved in a solar roofing system, namely production, customization, and the specialized skills required for installation.

Second, the most common retro-fitted solar roof systems are superimposed independent structures that attach over existing roofs which may compromise the integrity of the existing roofing material, void the roof warranty, and make roof maintenance or replacement costly and complicated.

Third, current available solar roof systems lack the ability to conform to most roof shapes and irregularities without the creation of customized components. Consequently, the actively photovoltaic area of a retro-fitted system becomes greatly reduced when compared to the total surface area of the roof.

Fourth, retro-fitted superimposed solar systems are generally not aesthetically pleasing. A solar roof shingle system such as taught by U.S. Pat. No. 5,575,861 addresses aesthetics and integration, but requires access to the roof decking underside and tedious wiring labor. Other systems such as taught by U.S. Pat. Nos. 6,875,914, 7,155,870, 5,590,495, and 7,328,534 lack flexibility of shape. All of these other systems require electrical skills along with the use of special mounting hardware attached to the roof decking.

So lastly and most importantly, all solar roof systems on the market today require installers with highly specialized training. At the very least, they require the services of a specialized electrician during installation. Specialized labor not only drives up the cost of installation, but limits consumer options for future serviceability.

Most homeowners purchase roofing products from roofing contractors who are skilled in the installation of traditional asphalt shingles, and not from roofing manufacturers or distributors. The solar roofing system of the present invention targets this very issue specifically. The system taught by the present disclosure not only provides solar shingles that can be made identical to traditional asphalt shingles in shape and size, but solar shingles that can be installed and manipulated in nearly the same manner as traditional asphalt shingles by anyone skilled in the practice of traditional roofing with traditional tools and fasteners. Therefore, this solar roofing system could become part of a more pedestrian catalogue of roofing products offered by any roofing contractor.

This photovoltaic system is first and foremost a roofing product, having all the advantages of adaptability and of requiring only existing standard roofing skills, tools, and fasteners to install.

BRIEF SUMMARY OF THE INVENTION

The present invention is directed to a shingle roofing system that converts solar energy on a roof surface into electrical current by means of photovoltaic tabs and channels that current to an accessible electrical conduit. This shingle system is assembled in the same manner as a traditional asphalt shingle roof, that is, in offset and overlapping rows.

A first aspect of the system of the present invention is directed to the form of the various components including a continuous starting course band, a continuous dividing band, and seven distinct shingle shapes with photovoltaic tabs.

The continuous starting course band serves the same function as the first course of cut or inverted shingles typically installed along the bottom edge of a traditional shingle roof under the first course of visible shingles, for the purpose of creating a waterproof surface below the spaces between the shingle tabs of the first row. The continuous starting course band is at least as tall as the shingle tabs and is tapered in profile from thicker at the bottom to thinner at the top. The continuous starting course band may be manufactured to custom widths with at least one factory sealed end or it may be cut on site with capped ends.

The dividing band can be sandwiched between any overlapping rows of shingles across the roof surface by mounting the continuous dividing band over the mounting section of one row of installed shingles and consequently covering it over by the tabs of the next row of installed shingles. The continuous dividing band is at least as tall as the shingle tabs and is tapered in profile from thicker at the bottom to thinner at the top. The continuous dividing band may also be manufactured to custom widths with at least one factory sealed end or it may be cut on site with capped ends.

The standard shingle unit shape, representing the most commonly used shingle on a given roof, can be substantially similar in size and shape to a traditional asphalt shingle having three tabs across and a mounting section above the tabs that is at least as tall as the tab section. These shingles can be cut apart on site as needed to complete a row across a given roof. A non-photovoltaic version of this shingle unit can be used where angled cuts or cuts through tabs are required on a given roof.

The left side shingle unit shape has at least two tabs with the left-most tab being half the width of a standard tab and a mounting section substantially equal in height to the mounting section of a standard shingle. The purpose of the left side shingle unit is to adjust alternating rows to form a straight left roof edge without the need for trimming tabs.

The right side shingle unit shape has at least two tabs with the right-most tab being half the width of a standard tab and a mounting section substantially equal in height to the mounting section of a standard shingle. The purpose of the right side shingle unit is to adjust alternating rows to form a straight right roof edge without the need for trimming tabs.

The standard top row shingle unit shape represents the most commonly used shingle on the top row of a given roof, closest to the roof ridge. The standard top row shingle unit shape is substantially similar to the standard shingle shape but with only two tabs and a mounting section of diminished height.

The top left side shingle unit shape is identical to the left side shingle unit but with a diminished mounting section such as the standard top row shingle unit. This shingle shape may be needed to keep the top left edge of a given roof flush at the top row.

The top right side shingle unit shape is identical to the right side shingle unit but with a diminished mounting section such as the standard top row shingle unit. This shingle shape may be needed to keep the top right edge of a given roof flush at the top row.

Finally, the optional top row shingle unit shape is identical to the standard top row shingle unit but with only one tab. This shape serves to make smaller one-tab adjustments to the width of a top row of shingles as needed for a given roof.

All shingle tabs may have release paper covering the photovoltaic device that is sufficiently opaque to keep the device from absorbing sunlight during installation. The release paper can be removed after the shingles are installed and the electrical connection to the house is made.

A second aspect of the system of the present invention is directed to the electrical connectivity among components. All shingles have separate electrical contacts for each photovoltaic tab on their bottom surfaces. All photovoltaic shingles, except top row shingles, have electrical contacts on the top surface of their mounting regions aligned so as to make electrical connectivity with the next overlapping row of bottom surface-mounted contacts. Positive and negative connections are made diagonally in opposing directions from row to row when the shingles are installed.

The continuous starting course band has embedded positive and negative conduits running its length with contacts exposed on its top surface aligned so as to make electrical connectivity with the overlapping first row of bottom surface-mounted shingle contacts.

The dividing band has two sets of embedded positive and negative conduits running its length that are vertically offset and electrically isolated from one each other; one set having contacts on the bottom surface of the band aligned to make electrical connectivity with the previous overlapped row of shingles, and the other having contacts on the top surface of the band aligned to make electrical connectivity with the next overlapping row of shingles. The dividing band serves to electrically separate overlapping rows of shingles where desired while at the same time connecting all shingles across those rows to each other.

The assembly of the components of the present invention can discretely divide the roof surface area into groupings of shingles that form electrically isolated zones. Once installed, the photovoltaic devices in the shingle tabs within each zone become connected to each other in parallel circuits. These zones are defined along their top and bottom edges by the various continuous bands and the top row shingles. The bottom edge of the first zone is defined by a continuous starting course band. The top edge of the topmost zone is defined by the top row shingle shapes. The continuous bands serve to house embedded electrical conduits to which all positive and negative connections from the photovoltaic shingle tabs throughout the roof surface feed. The leads from these continuous bands found along a given side edge of the roof surface can be wired to each other such that the zones of parallel circuits are connected to each other in series. The desired ratio of voltage to amperage required for useable electrical output can be controlled by determining how many continuous dividing bands are to be installed on a given roof surface. Continuous dividing bands create a redundancy of connections across the top row of shingles of the zone they create, however, continuous starting course bands may also be used in place of continuous dividing bands to isolate rows of shingles into zones.

All electrical connections among components are made automatically on contact by overlapping the shingle units and continuous bands without the need for wiring or hardware or special attention by the roof installer. Electrical connections can exist in any form, but preferably in the form of exposed wire contacts set substantially perpendicularly to bladed contacts consisting of any number of blades, though double-bladed contacts are preferred, to insure connectivity with a broad margin of accuracy during installation. Electrical connections can alternatively exist in the form of contacts fashioned with an area of hooked, hook & loop, or mushroom cap shaped wire ends that interlock when pressed together. Contacts in any form may be coated with a low-temperature fusible metal alloy that would automatically solder together any connections subject to electrical hot spots in a self-healing fashion. Contacts may be sealed either by a continuous quantity of or an encircling quantity of adhesive on or around one or both contacts.

A third aspect of the system of the present invention is directed to the redundant connectivity established when the various components are assembled to form a roof. Because there is positive and negative connectivity between all half tabs along the roof side edges and their adjacent full tabs, and between those one-and-one-half tabs and the alternating full tabs of the rows above and below them, there is formed positive and negative connectivity along both roof side edges. Furthermore, because there is positive and negative connectivity between pairs of top row tabs and along the continuous bands, when all combined this solar shingle system transfers both positive and negative connections along roof edges and intermittently across the roof surface when installed. Additionally, the system transfers positive connections diagonally from row to row in one direction and negative connections diagonally from row to row in the opposite direction across the roof surface. This creates redundant connections throughout that can allow all photovoltaic tabs to feed the system even if there are interruptions in the roof surface or jogs along its edges.

BRIEF DESCRIPTION OF THE DRAWING FIGURES

FIGS. 1A through 1C show a standard shingle unit according to the present invention in which FIG. 1A is a top view, FIG. 1B is a bottom view, and FIG. 1C is a cutaway view showing the circuitry contained in the shingle between its top and bottom surfaces.

FIGS. 2A through 2C show a left side shingle unit for alternating rows according to the present invention in which FIG. 2A is a top view, FIG. 2B is a bottom view, and FIG. 2C is a cutaway view showing the circuitry contained in the shingle between its top and bottom surfaces.

FIGS. 3A through 3C show a right side shingle unit for alternating rows according to the present invention in which FIG. 3A is a top view, FIG. 3B is a bottom view, and FIG. 3C is a cutaway view showing the circuitry contained in the shingle between its top and bottom surfaces.

FIGS. 4A through 4C show a standard top row shingle unit according to the present invention in which FIG. 4A is a top view, FIG. 4B is a bottom view, and FIG. 4C is a cutaway view showing the circuitry contained in the shingle between its top and bottom surfaces.

FIGS. 5A through 5C show a top row left side shingle unit according to the present invention in which FIG. 5A is a top view, FIG. 5B is a bottom view, and FIG. 5C is a cutaway view showing the circuitry contained in the shingle between its top and bottom surfaces.

FIGS. 6A through 6C show a top row right side shingle unit according to the present invention in which FIG. 6A is a top view, FIG. 6B is a bottom view, and FIG. 6C is a cutaway view showing the circuitry contained in the shingle between its top and bottom surfaces.

FIGS. 7A through 7C show a single top row shingle unit according to the present invention in which FIG. 7A is a top view, FIG. 7B is a bottom view and FIG. 7C is a cutaway view showing the circuitry contained in the shingle between its top and bottom surfaces.

DETAILED DESCRIPTION OF THE PREFERRED EMBODIMENTS

Figure 1A:
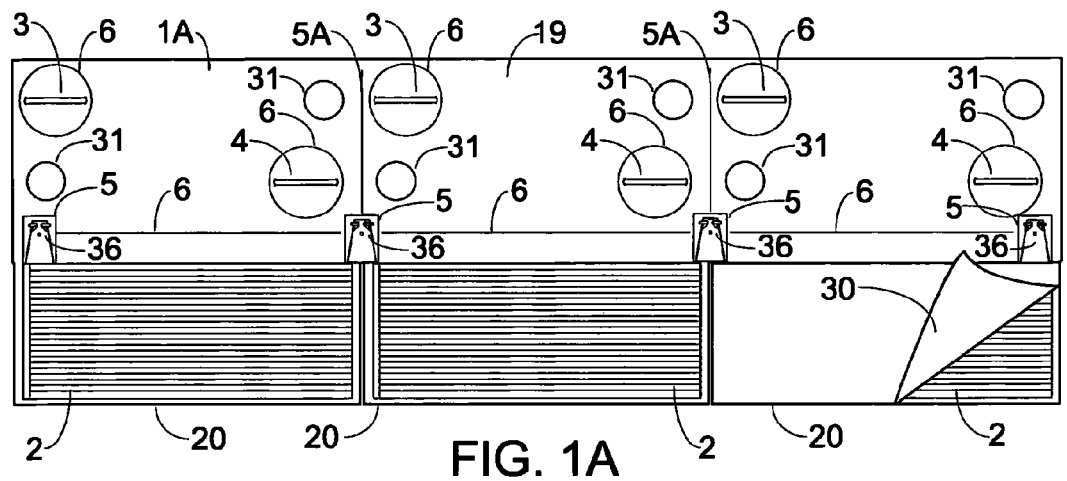

The present invention relates to a solar shingle roofing system, including various components that comprise this roofing system, various relationships between components, and various configurations of electrical connectivity that characterize the roofing system. The function of this solar roofing system, as included in the scope of this invention, is two-fold: to provide a watertight protective roofing surface and to transform solar energy from a plurality of photovoltaic devices to a consolidated and predetermined conduit of electrical current. It is to be understood that this invention can employ any photovoltaic device, regardless of form or efficiency, regardless of whether it is a cell, film, coating, or any other form and that all such photovoltaic devices can be incorporated into this roofing system. It is also to be understood that the shingles can be fabricated from any one or combination of a variety of pliable, waterproof, non-conductive, tear-resistant materials commonly used to make shingles or commonly used to insulate electrical circuits. Furthermore, it should be understood that any means of converting the energy generated by this roofing system to a usable and serviceable form can also be incorporated with the shingles taught by the present invention.

This solar roofing system comprises seven shape variations of a solar shingle along with two types of continuous bands that, together with a non-solar version of one shingle shape, can be installed on any building structure's surface that might typically be shingled. All shingle variations can be made of the same materials and in the same manner. Top layers 1A through 1G, and 18 can be a clear, pliable, waterproof, non-conductive, tear-resistant laminate material. Top layer 1A through 1G can encapsulate the photovoltaic device as well as contacts or wires. All internal electrical components including wires 11 and 12 and all photovoltaic device terminals 13 and 14 can be sealed or cast in between the top layer and bottom layer 7 within a spacer layer 10 that has voids cut to fit around and embed all circuitry and may fit around photovoltaic devices as well. Bottom layer 7 is a material that is substantially similar to the top layer material in terms of thickness and composition so as to minimize any warping from expansion or contraction due to temperature shifts. All shingle variations are the same thickness. All shingle variations have a tab section of uniform height. All shingles have a uniform space between tabs and a rebate 32 that is half that space along the outside edge of the outer tabs so as to form uniform spaces between tabs when shingles are abutted.

All shingle variations can have a horizontal line of either continuous or intermittent adhesive 6 across the full width of the shingle above the photovoltaic tabs along with adhesive 6 encircling each contact. Adhesive 6 can be any non-conductive waterproof barrier with resistance to heat from sunlight as well as freezing temperatures and possessing enough elasticity to endure slight shifts with the expansion and contraction of typical roof decking throughout the seasons while remaining watertight. Adhesive 6 may be in the form of a gasket that is double-sided VHB tape with a soft closed cell silicon carrier having a substantially similar thickness as the electrical connection which it surrounds. Shingles can be supplied with a protective release film over adhesive 6 for storage and handling.

Figure 20:
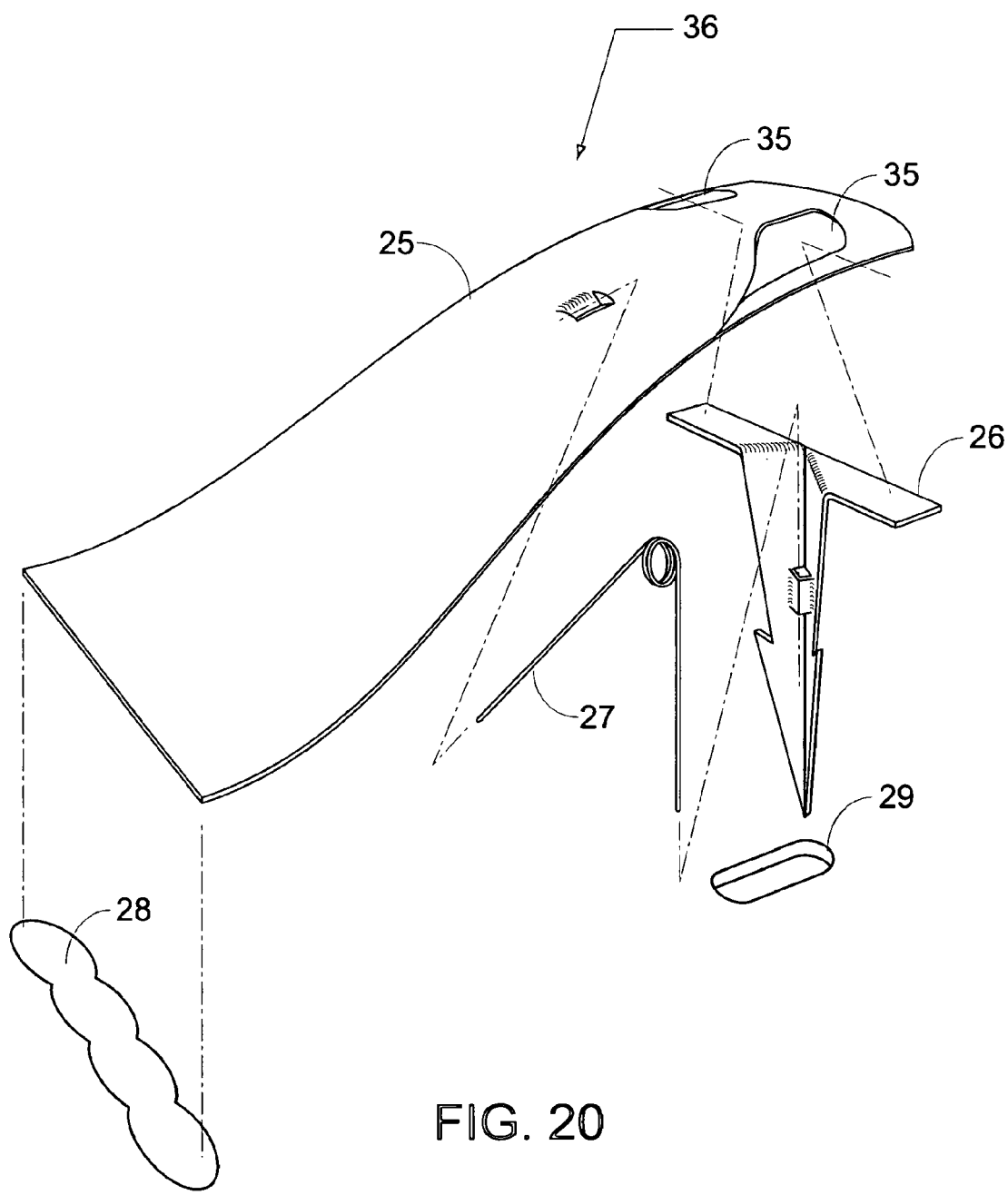
FIG. 20 shows an exploded view of a pre-positioned fastener.

All components can have a graphic element 5 marking target areas for piercing through with fasteners during installation so as to avoid disturbing any internal circuitry. Components may also have a graphic element 5A indicating areas where components may be cut on site either for alignment in the case of the continuous bands or to avoid circuitry in the case of the standard shingle unit. Shingle mounting areas and continuous bands may also consist of clear materials, thereby allowing the installer to see where circuitry and photovoltaic devices exist. Shingles and continuous bands may be installed with any standard roofing fastener, however, components may alternatively have pre-positioned fasteners already attached in appropriate positions that would only require the installer to hammer them into a seated position during installation. FIG. 20 illustrates a preferred variation of the pre-positioned fastener assembly 36 that is flattened when stored and can be made to spring into a perpendicular orientation to the shingle surface when the shingle is removed from a stack or a bundle by means such as spring 27.

Components may possess magnetic areas 31 on their top and bottom surfaces that help align the shingles when placed on the roof decking.

All photovoltaic devices 2 described herein have a positive photovoltaic device terminal 13 and a negative photovoltaic device terminal 14 enclosed within the shingles. Terminals are attachment points to the photovoltaic device in whatever form is required for the device.

FIG. 1A illustrates the top view of a standard shingle unit that could have any number of tabs in any proportion and with any thickness. In this representation, the standard shingle unit is depicted in the shape of a common three-tab asphalt shingle. The standard shingle unit shape-has a mounting section 19 above the full tabs 20 that is at least the same height as the tab section. The standard shingle unit has a photovoltaic device 2 embedded in each full tab 20. Top layer 1A can have graphic elements 5 and 5A and adhesive 6 on its mounting section.

Top layer 1A has a positive wire contact 3 and a negative wire contact 4 for each photovoltaic device seated and exposed on top of the mounting section 19 region above its corresponding full tab 20. All top surface wire contacts 3 and 4 are oriented horizontally in this representation, though they could also all be oriented vertically. All contacts 3 can also be oriented differently from wire contacts 4. The ends of all wire contacts are embedded back into the shingle for durability. All positive wire contacts 3 are situated in the same relationship to their corresponding tabs. All negative wire contacts 4 are situated in the same relationship to their corresponding tabs and at a different elevation from positive wire contacts 3.

Figure 1B:
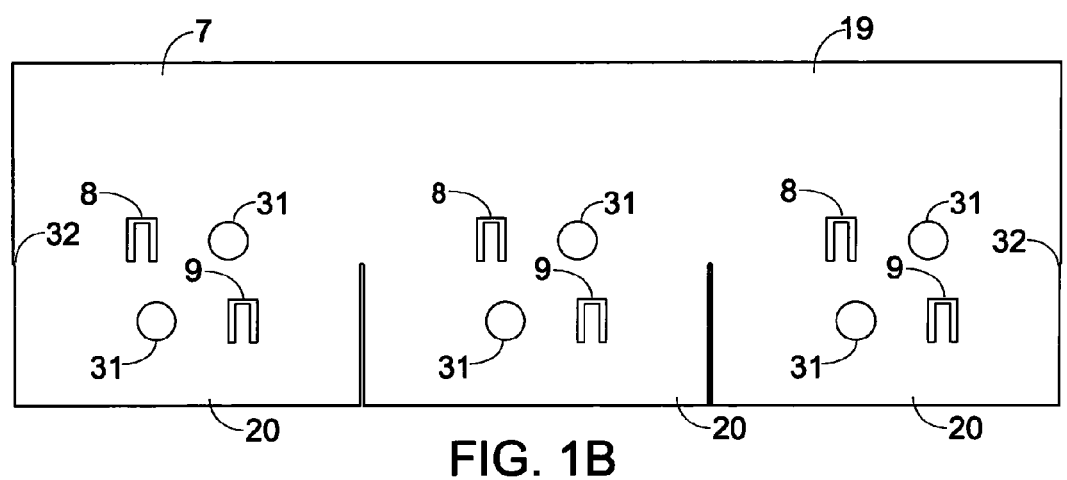
Figure 15:
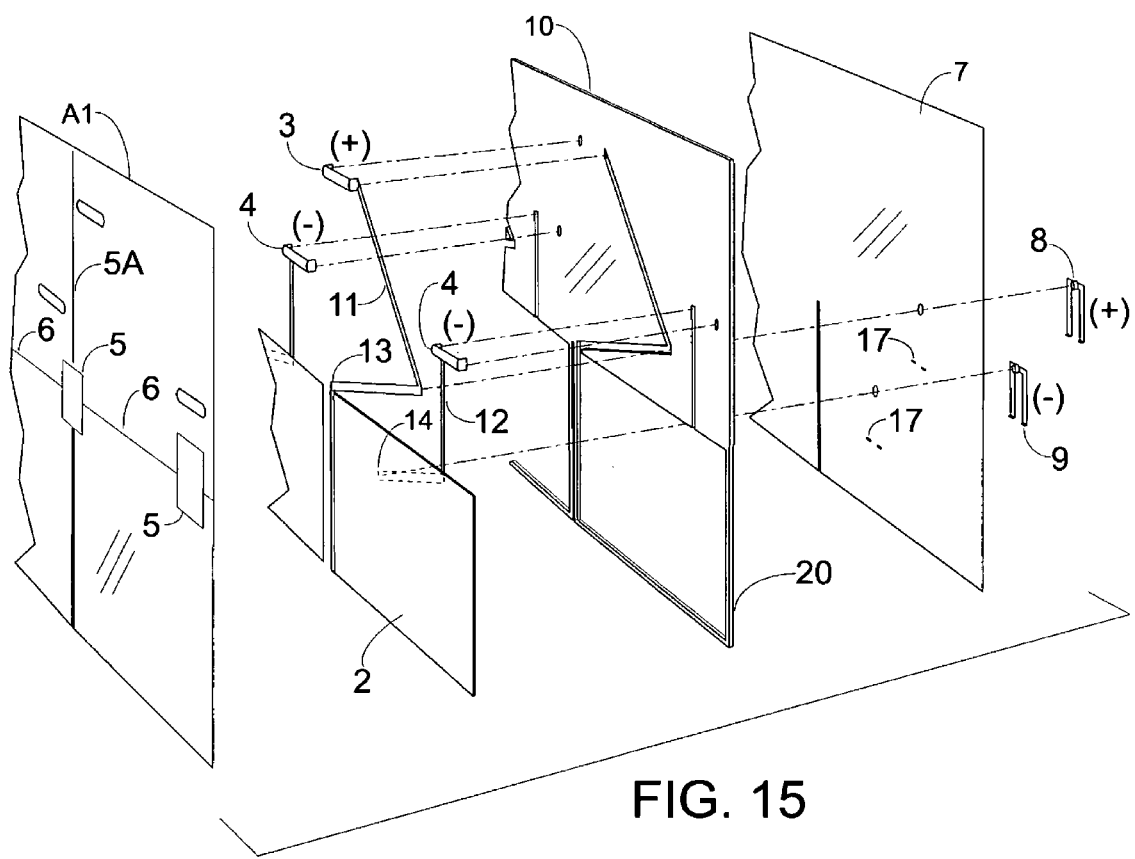
FIG. 15 shows an exploded view of a typical standard shingle unit tab.

FIG. 1B illustrates the bottom view of the standard shingle unit. The standard shingle unit has a pair of bladed contacts 8 and 9 surface-mounted on the bottom layer 7 for each tab section of the shingle. Contacts 8 and 9 can have one blade or multiple blades but preferably double blades as shown. Positive double-bladed contacts 8 attach to the positive terminals 13 and negative double-bladed contacts 9 attach to the negative terminals 14 of each photovoltaic device 2. The width between double-bladed contacts 8 and 9 is less than the length of wire contacts 3 and 4. All double-bladed contacts have ends that are bent and return back into the spacer layer 10 through slotted holes 17 in bottom layer 7 for durability. This is best seen in FIG. 15. All positive double-bladed contacts 8 are positioned uniformly so as to make electrical connectivity with positive wire contacts 3 when shingles are installed in a traditional overlapping and offset manner. All negative double-bladed contacts 9 are positioned uniformly so as to make electrical connectivity with negative wire contacts 4 when shingles are installed in a traditional overlapping and offset manner.

Figure 18:
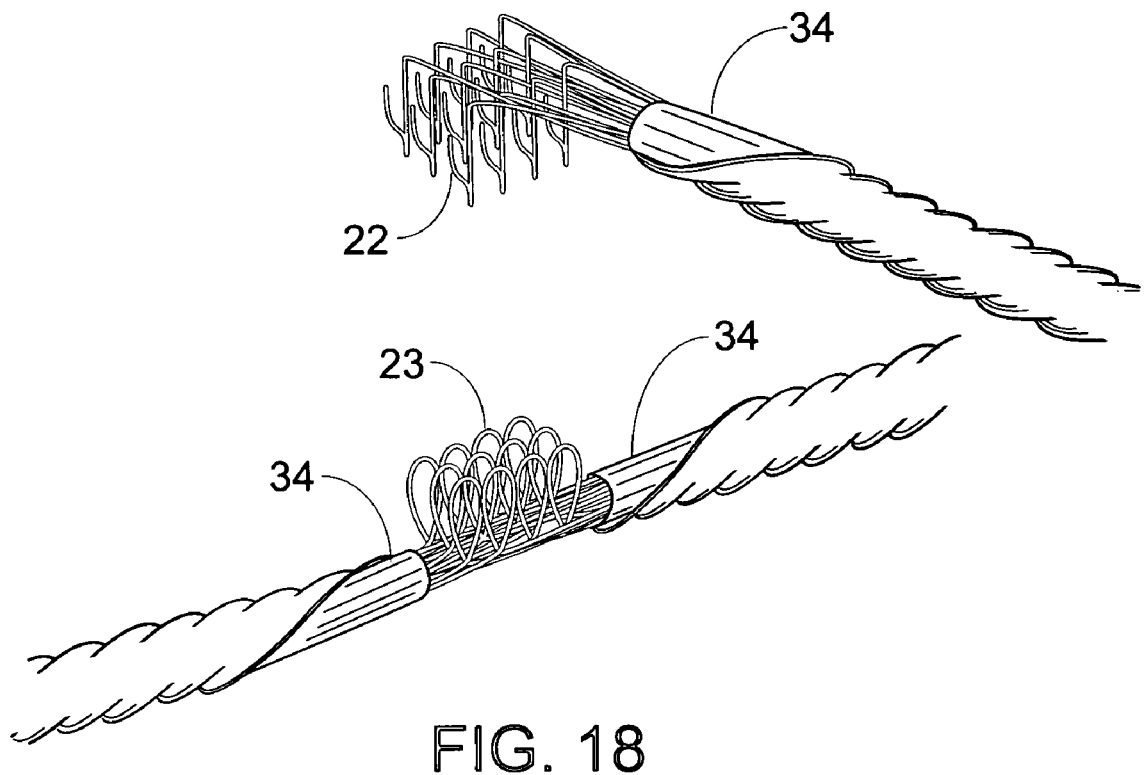
FIG. 18 shows alternate hook & loop electrical contacts.
Figure 19:
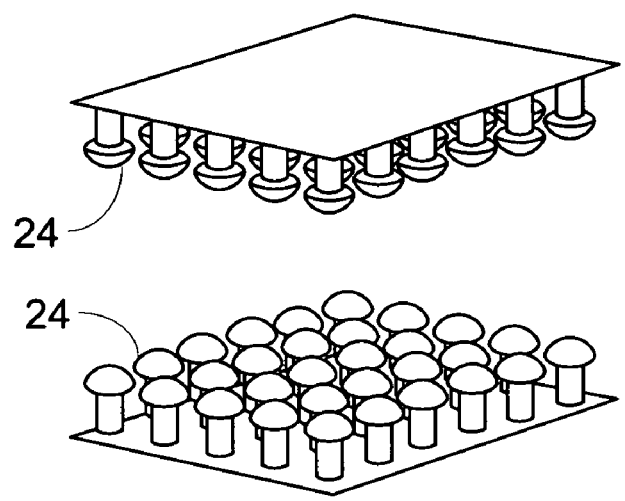
FIG. 19 shows alternate mushroom contacts.

Alternatively hook & loop electrical contacts as shown in FIG. 18 could be used such that the hooks 22 are created at the end of wire runs, substituting double-bladed contacts 8 and 9 and loops 23 can be created in the middle of wire runs, substituting the wire contacts 3 and 4. Another electrical contact alternative that can be used in the system is shown in FIG. 19 where conductive clusters of interlocking mushroom shapes 24 are soldered or otherwise electrically connected to wires 11 and 12. Any form of electrical contact may be tinned with a low temperature fusible alloy for possible self-soldering properties in the occurrence of an electrical hot spot.

Figure 1C:
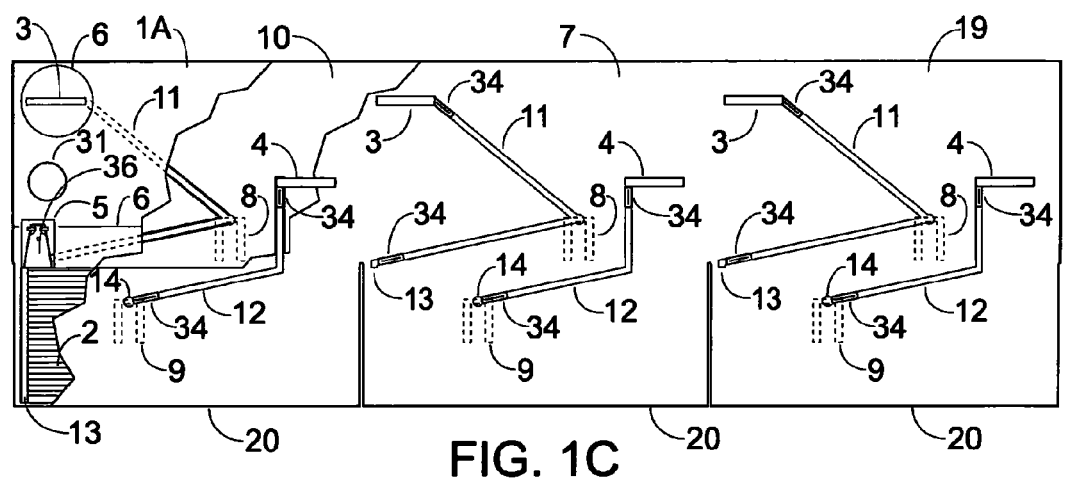

FIG. 1C illustrates a cutaway of the standard shingle unit showing the circuitry and the spacer layer 10 sandwiched between top layer 1A and bottom layer 7. Positive embedded wire 11 connects positive terminals 13 to wire contacts 3. Negative embedded wire 12 connects negative terminals 14 to wire contacts 4. Wire contacts may be exposed continuations of embedded wires. Wires may take any form but they are preferably a flattened, stranded wire made of silver coated carbon fibers or some other highly conductive material in order to minimize its thickness. Embedded wires may be coated for extra insulation. Wires 11 and 12 may be equipped with a fusible link 34 that fails in the event of an electrical short. If a fusible link 34 is used in conjunction with contacts that are tinned with a fusible alloy, the fusible link 34 must have a higher melting temperature than the tinned contacts. Alternatively, terminals 13 and 14 or contacts 3 and 4 may themselves be fusible links.

Positive embedded wire 11 and negative embedded wire 12 are situated so as to not cross paths inside the shingle. Embedded wires 11 and 12 do not stray into the region of section 19 between tabs in a standard shingle unit. This makes it possible to cut the standard shingle unit tabs apart without disturbing the circuitry.

A non-photovoltaic filler version of the standard shingle unit can be included in order to fill in areas of a roof that require shingles cut at odd angles. A non-photovoltaic filler version of the standard shingle unit would have no photovoltaic devices 2, contacts 3,4,8, and 9, wiring 11 and 12, or voids in layer 10.

Figure 2A:
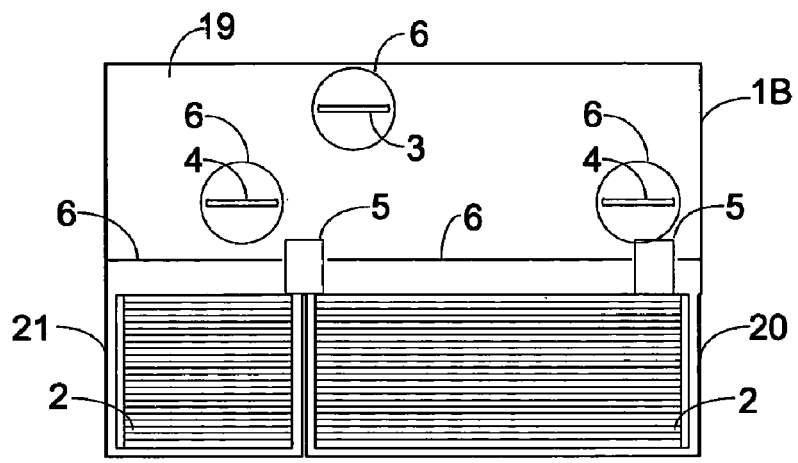

FIG. 2A illustrates the top view of a left side shingle unit to be used for alternating rows. Left side shingle units allow the installed left roof edge to be flush without the need for trimming shingles. A left side shingle unit has two tabs; a full tab 20 on the right side and a half tab 21 that is half the width of a full tab on the left side. The left side shingle unit shape has a mounting section 19 equivalent in height to a standard shingle unit mounting section. The left side shingle unit has a photovoltaic device 2 embedded in both the full tab 20 and in the half tab 21 in the same manner as a standard shingle tab.

Top surface 1B has a positive wire contact 3 and a negative wire contact 4 exposed on top of the mounting section 19 in the region above the full tab 20 in the same configuration as in a standard shingle tab. The left side shingle unit has a negative wire contact 4 exposed on top of the mounting section 19 in the region above the half tab 21 positioned so as to make electrical connectivity with a negative double-bladed contact 9 from the next installed row. Top layer 1B can have graphic elements 5 and adhesive 6 on its surface.

Figure 2B:
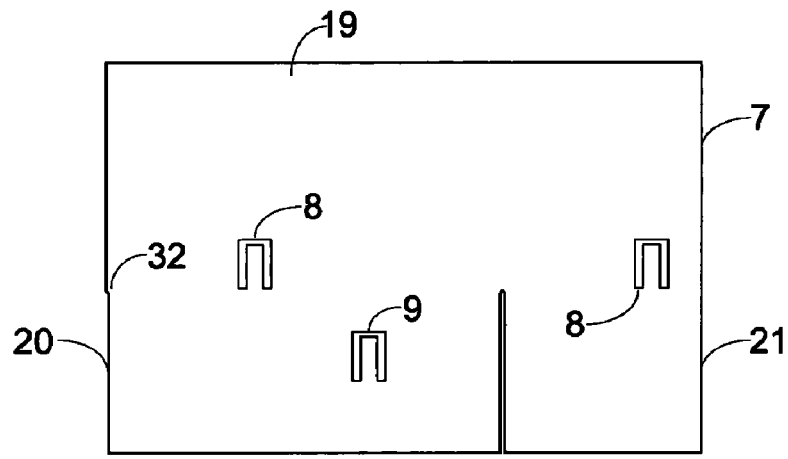

FIG. 2B illustrates the bottom view of the left side shingle unit. The left side shingle unit's full tab 20 is identical to a full tab 20 in a standard shingle tab with regard to the position of its positive and negative terminals 13 and 14 and its double-bladed contacts 8 and 9. The left side shingle unit's half tab 21 has only a double-bladed contact 8 attached to the positive terminal 13 of its photovoltaic device 2. The half tab's positive double-bladed contact 8 is positioned so as to align with a standard shingle's positive wire contact from the previous installed row.

Figure 2C:
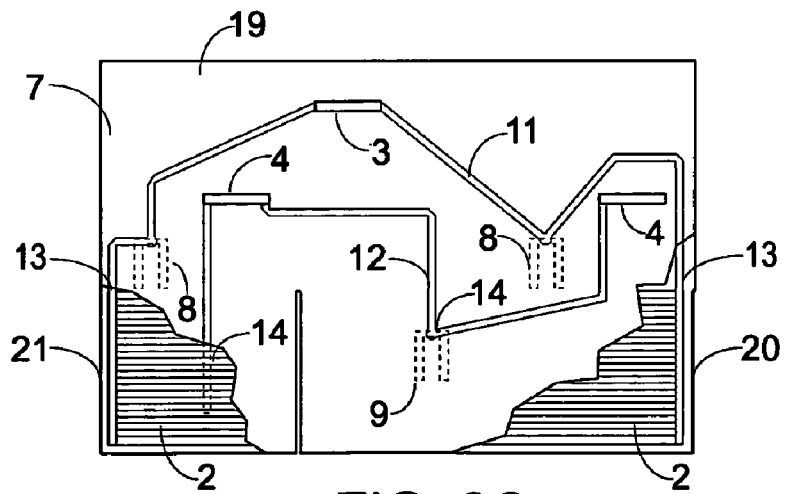

FIG. 2C illustrates a cutaway of the left side shingle unit showing the circuitry sandwiched between top layer 1B and bottom layer 7. Positive embedded wire 11 connects the positive terminals 13 of both photovoltaic devices 2 to each other and to the wire contact 3 positioned over the full tab in mounting section 19 in the same manner as a standard shingle unit. Negative embedded wire 12 connects the negative terminals 14 of both photovoltaic devices 2 to each other and to both wire contacts 4 above each tab on the mounting section 19. Positive embedded wire 11 and negative embedded wire 12 are situated so as to not cross paths inside the shingle.

Figure 3A:
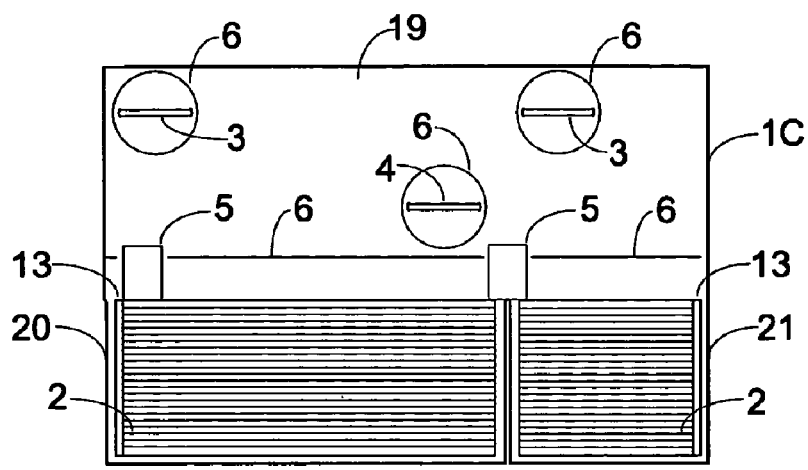

FIG. 3A illustrates the top view of a right side shingle unit to be used for alternating rows. Right side shingle units allow the installed right roof edge to be flush without the need for trimming shingles. A right side shingle unit has two tabs; a full tab 20 on the left side and a half tab 21 on the right side. The right side shingle unit shape has a mounting section 19 equivalent in height to a standard shingle unit mounting section. The right side shingle unit has a photovoltaic device 2 embedded in both the full tab 20 and in the half tab 21 in the same manner as the left side and standard shingle tabs.

Top surface 1C has a positive wire contact 3 and a negative wire contact 4 exposed on top of the mounting section 19 in the region above the full tab 20 in the same configuration as in the standard shingle. The right side shingle unit has a positive wire contact 3 exposed on top of the mounting section 19 in the region above the half tab 21 positioned so as to make electrical connectivity with a positive double-bladed contact 8 from the next installed row. Top layer 1C can have graphic elements 5 and adhesive 6 on its surface.

Figure 3B:
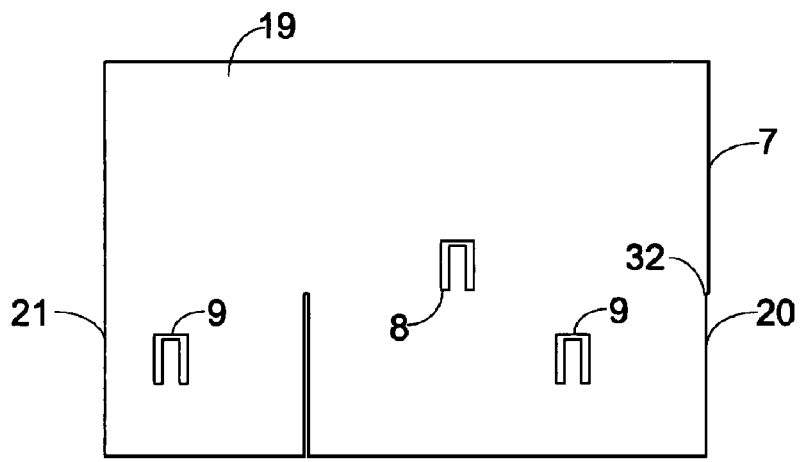

FIG. 3B illustrates the bottom view of the right side shingle unit. The right side shingle unit's full tab 20 is identical to a full tab 20 in a standard shingle tab with regard to the position of its positive and negative double-bladed contacts 8 and 9. The right side shingle unit's half tab 21 has only a double-bladed contact 9 attached to the negative terminal 14 of its photovoltaic device 2. The half tab's negative double-bladed contact 9 is positioned so as to align with a standard shingle's negative wire contact from the previous installed row.

Figure 3C:
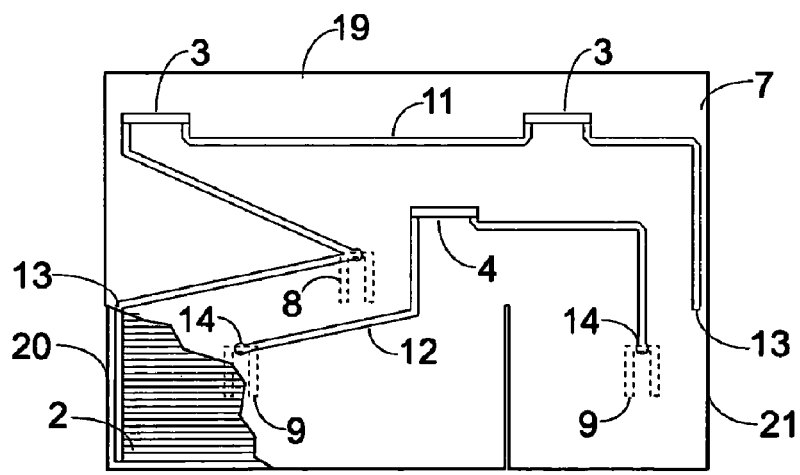

FIG. 3C illustrates a cutaway of the right side shingle unit showing the circuitry sandwiched between top layer 1C and bottom layer 7. Positive embedded wire 11 connects the positive terminals 13 of both photovoltaic devices 2 to each other and to both wire contacts 3 positioned on the mounting section 19. Negative embedded wire 12 connects the negative terminals 14 of both photovoltaic devices 2 to each other and to the wire contact 4 on the mounting section 19 above the full tab. Positive embedded wire 11 and negative embedded wire 12 are situated so as to not cross paths inside the shingle.

Figure 4A:
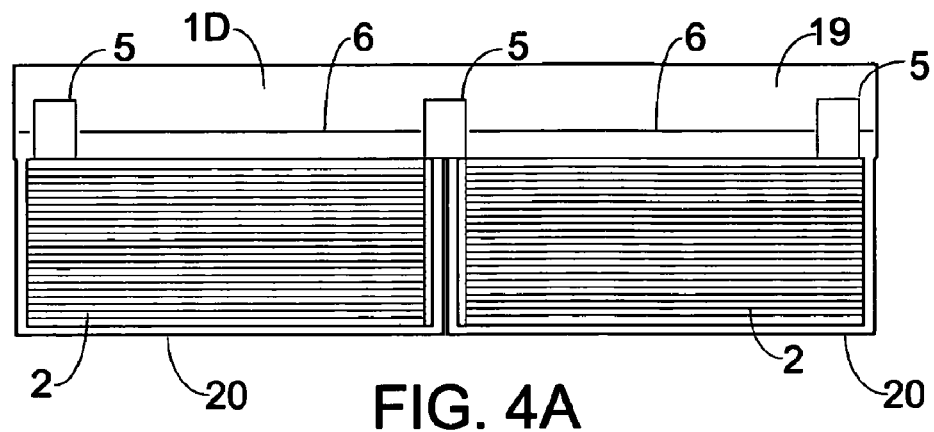

FIG. 4A illustrates the top view of a standard top row shingle unit that could have any number of tabs. In this representation, the standard top row shingle unit is depicted with two tabs. The standard top row shingle unit shape has a mounting section 19 above the full tabs 20 that has a predetermined diminished height compared to the height of mounting section 19 of a standard shingle unit. The standard top row shingle unit has a photovoltaic device 2 embedded in each full tab 20 in the same manner as in a standard shingle unit. Top surface 1D of the standard top row shingle unit has no wire contacts in its mounting section 19. Top layer 1D can have graphic elements 5 and adhesive 6 on its surface.

Figure 4B:
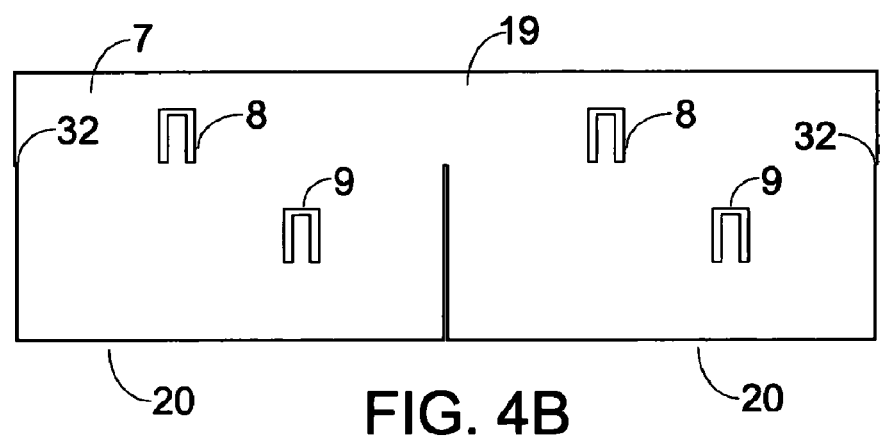

FIG. 4B illustrates the bottom view of the standard top row shingle unit. The standard top row shingle unit's full tabs 20 are identical to the full tabs 20 in a standard shingle unit with regard to the position of its positive and negative double-bladed contacts 8 and 9.

Figure 4C:
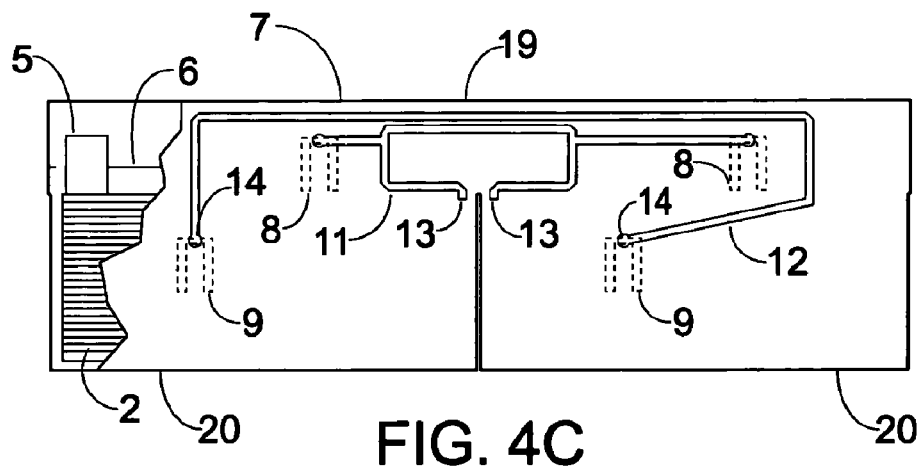

FIG. 4C illustrates a cutaway of the standard top row shingle unit showing the circuitry sandwiched between top layer 1D and bottom layer 7. Positive embedded wire 11 connects positive terminals 13 to each other. Negative embedded wire 12 connects negative terminals 14 to each other. Positive embedded wire 11 and negative embedded wire 12 are situated so as to not cross paths inside the shingle.

Figure 5A:
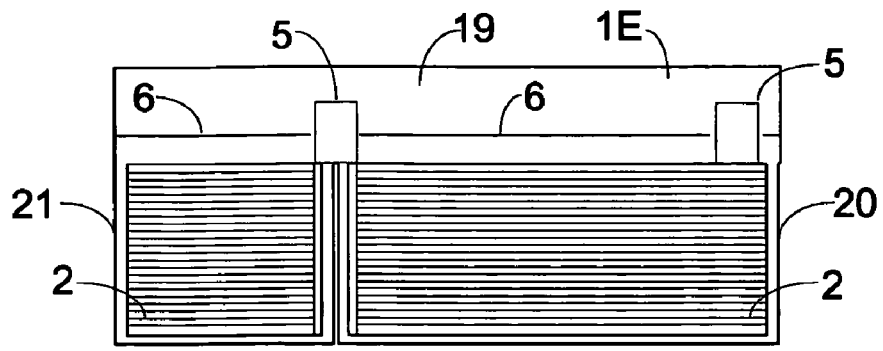

FIG. 5A illustrates the top view of a top left side shingle unit. A top left side shingle unit may be needed to make a flush left edge depending on which of the two alternating and offset row patterns ends up as a top row on a given roof. A top left side shingle unit has two tabs; a full tab 20 on the right side and a half tab 21 on the left side. The top left side shingle unit shape has a diminished mounting section 19 equivalent in height to a standard top row shingle unit mounting section. The top left side shingle unit has a photovoltaic device 2 embedded in both the full tab 20 and in the half tab 21 in the same manner as a standard shingle tab. Top surface 1E of the top left shingle unit has no wire contacts in its mounting section 19. Top layer 1E can have graphic elements 5 and adhesive 6 on its surface.

Figure 5B:
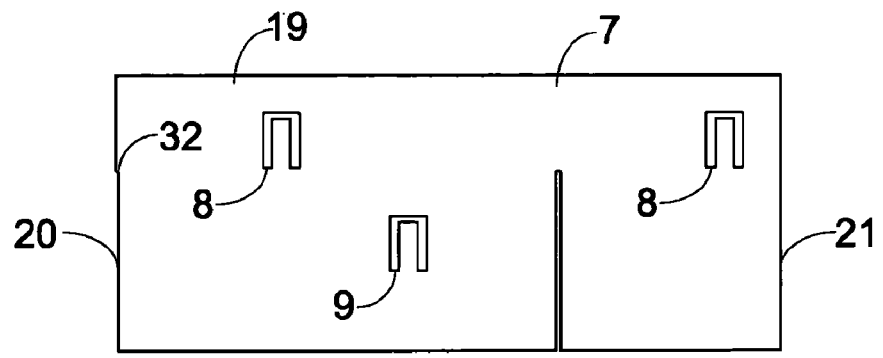

FIG. 5B illustrates the bottom view of the top left side shingle unit. The top left side shingle unit's tabs are identical to the left side shingle unit's tabs with regard to the position of its positive and negative double-bladed contacts 8 and 9.

Figure 5C:
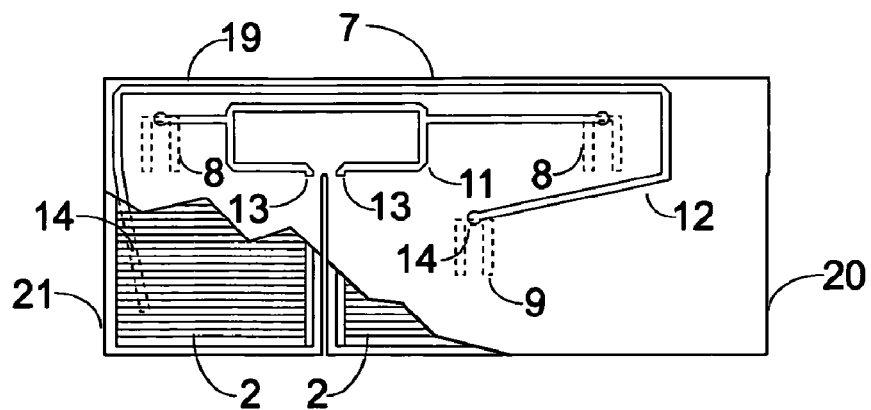

FIG. 5C illustrates a cutaway of the top left side shingle unit showing the circuitry sandwiched between top layer 1E and bottom layer 7. Positive embedded wire 11 connects the positive terminals 13 of both photovoltaic devices 2 and the two positive double-bladed contacts 8 to each other. Negative embedded wire 12 connects the negative terminals 14 of both photovoltaic devices 2 to each other and to the negative double-bladed contact 9 on the full tab 20. Positive embedded wire 11 and negative embedded wire 12 are situated so as to not cross paths inside the shingle.

Figure 6A:
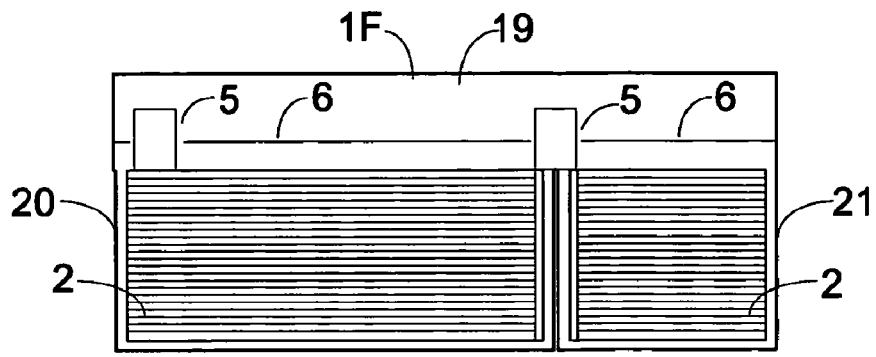

FIG. 6A illustrates the top view of a top right side shingle unit. A top right side shingle unit may be needed to make a flush right edge depending on which of the two alternating and offset row patterns ends up as a top row on a given roof. A top right side shingle unit has two tabs; a full tab 20 on the left side and a half tab 21 on the right side. The top right side shingle unit shape has a diminished mounting section 19 equivalent in height to a standard top row shingle unit mounting section. The top right side shingle unit has a photovoltaic device 2 embedded in both the full tab 20 and in the half tab 21 in the same manner as a standard shingle tab. Top surface 1F of the top left shingle unit has no wire contacts in its mounting section 19. Top layer 1F can have graphic elements 5 and adhesive 6 on its surface.

Figure 6B:
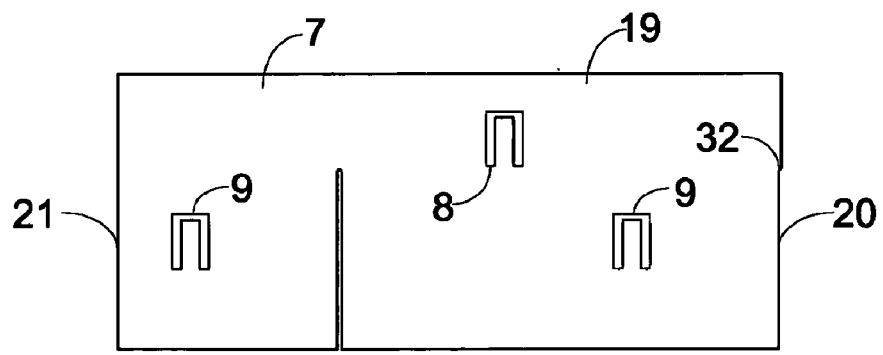

FIG. 6B illustrates the bottom view of the top right side shingle unit. The top right side shingle unit's tabs are identical to the right side shingle unit's tabs with regard to the position of its positive and negative double-bladed contacts 8 and 9.

Figure 6C:
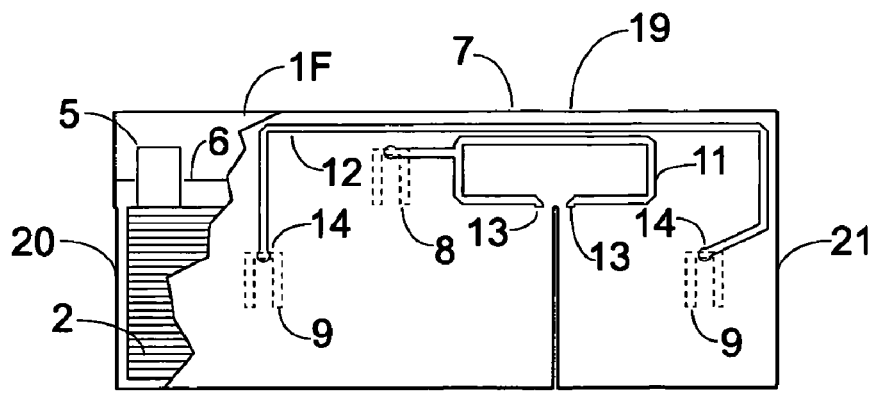

FIG. 6C illustrates a cutaway of the top right side shingle unit showing the circuitry sandwiched between top layer 1F and bottom layer 7. Positive embedded wire 11 connects the positive terminals 13 of both photovoltaic devices 2 to each other and to the positive double-bladed contact 8 in the full tab region. Negative embedded wire 12 connects the negative terminals 14 of both photovoltaic devices 2 and the two negative double-bladed contacts 9 to each other. Positive embedded wire 11 and negative embedded wire 12 are situated so as to not cross paths inside the shingle.

Figure 7A:
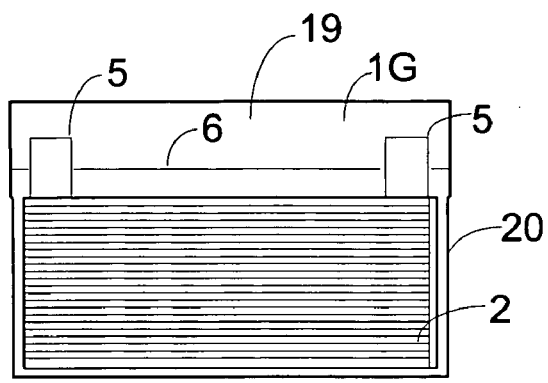

FIG. 7A illustrates the top view of an optional top row shingle unit. Because top row shingles have circuitry between tabs, a standard top row shingle unit's tabs cannot be cut apart. Therefore, optional single-tabbed top row shingle units may be needed to adjust the top row to the width of a given roof by the width of one tab. An optional top row shingle unit has only one full tab 20 and a diminished mounting section 19 equivalent in height to a standard top row shingle unit mounting section. The optional top row shingle unit has a photovoltaic device 2 embedded in its full tab 20 in the same manner as a standard shingle tab. Top surface 1G of the optional top row shingle unit has no wire contacts in its mounting section 19. Top layer 1G can have graphic elements 5 and adhesive 6 on its surface.

Figure 7B:
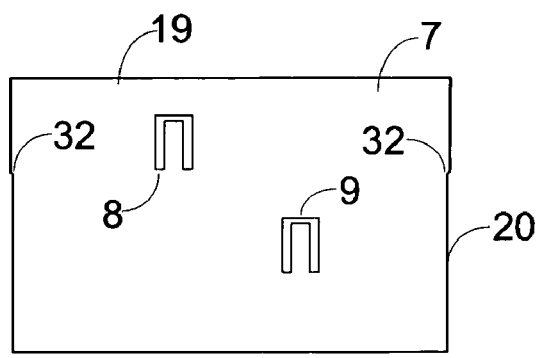

FIG. 7B illustrates the bottom view of the optional top row shingle unit. The optional top row shingle unit's tab 20 is identical to a standard shingle unit's tabs with regard to the position of its positive and negative double-bladed contacts 8 and 9.

Figure 7C:
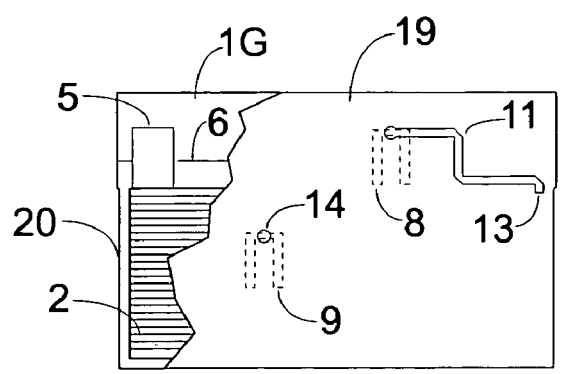

FIG. 7C illustrates a cutaway of the optional top row shingle unit showing the circuitry sandwiched between top layer 1G and bottom layer 7. Positive embedded wire 11 connects the positive terminal 13 on the photovoltaic device 2 to the positive double-bladed contact 8. Negative contact 14 connects the negative double-bladed contact 9 to the photovoltaic device 2.

Figure 8:
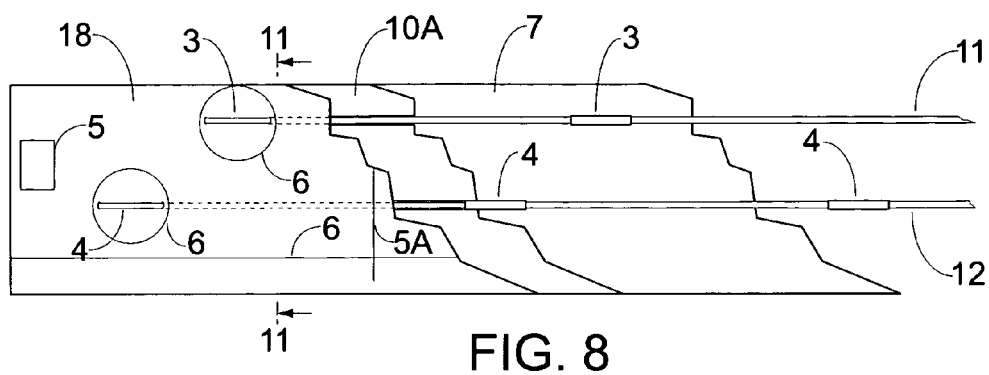
FIG. 8 shows a cutaway view of the continuous starting course band according to the present invention showing the circuitry between its top and bottom surfaces.

FIG. 8 illustrates a cutaway of the continuous starting course band showing the circuitry sandwiched between top layer 18 and bottom layer 7. The band can be produced for distribution in rolls with possibly one finished and sealed end. The rolls can be made to length or trimmed to size at the roof installation site where the positive lead 11 and negative lead 12 can be stripped at the trimmed end. Ends may be capped and sealed on site with a continuous band end cap 33 shown in FIG. 10. The continuous starting course band is installed flush along the bottom edge of the roof. The continuous starting course band replaces the starter course of cut shingles used in traditional asphalt roof installations. The subsequent first row of shingles is installed over top of the band, flush to the band's bottom edge. The continuous starting course band provides a waterproof seal for the slots between the tabs of the first row of shingles. The continuous starting course band also provides the base positive and negative leads for the first zone of the solar shingle system installed on one face of a given roof. The continuous starting course band may also be used between rows of shingles to isolate groups of shingles into zones.

The continuous starting course band is at least as tall as the shingle tab height and can be as thin or thinner than a shingle unit at its top edge and thicker at the bottom edge. Top surface 18 is the same or similar material as the shingle top layers. Spacer layer 10A is similar to shingle spacer layer 10 but with the tapered profile as described. The continuous starting course band has an embedded positive wire 11 running through it with intermittent wire contacts 3 exposed on the top surface 18. Wire contacts 3 are positioned to allow for connectivity with the first row of shingles' positive double-bladed contacts 8. The band has an embedded negative wire 12 running through it with intermittent wire contacts 4 exposed on the top surface 18. Wire contacts 4 are positioned to allow for connectivity with the first row of shingles' negative double-bladed contacts 9. Top layer 18 can have graphic elements 5 and 5A and adhesive 6 on its surface.

Figure 9:
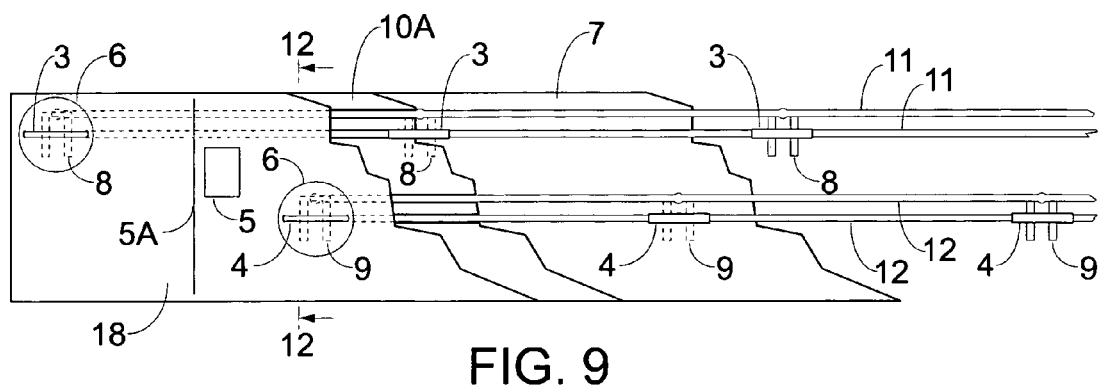
FIG. 9 shows a cutaway view of the continuous dividing band according to the present invention showing the circuitry between its top and bottom surfaces.

FIG. 9 illustrates a cutaway of the continuous dividing band showing the circuitry sandwiched between top layer 18 and bottom layer 7. The band can be produced for distribution in rolls with possibly one finished and sealed end. The rolls can be made to length or trimmed to size at the roof installation site where the positive leads and negative leads can be stripped from the positive and negative wire 11 and 12 exposed at the trimmed end. Ends may be capped and sealed on site with a continuous band end cap 33 shown in FIG. 10. The continuous dividing band can be installed over top of the mounting sections of a shingle row representing the top of a given roof zone. The subsequent row of shingles become the first course of the next zone and is installed over top of the continuous dividing band, flush to the continuous dividing band's bottom edge. The continuous dividing band provides base positive and negative leads for the zone below it and, separately, base positive and negative leads for the zone above it.

The continuous dividing band is substantially as tall as the standard shingle mounting section height and can be tapered in profile similar to the continuous starting course band. Top surface 18 is the same or similar material as the shingle top layers. The continuous dividing band has two embedded parallel positive wires 11 running through it that are vertically offset and isolated from each other. The topmost positive wire 11 has intermittent positive double-bladed contacts 8 attached to it through the bottom layer 7 positioned so as to make contact with the positive wire contacts 3 of the previous row of shingles. The lower positive wire 11 has intermittent wire contacts 3 exposed on the top surface 18 positioned so as to make contact with the positive double-bladed contacts 8 of the next row of shingles. The dividing band has two embedded negative wires 12 running through it that are vertically offset and isolated from each other. The topmost negative wire 12 has intermittent negative double-bladed contacts 9 attached to it through the bottom layer 7 positioned so as to make contact with the negative wire contacts 4 of the previous row of shingles. The lower negative wire 12 has intermittent wire contacts 4 exposed on the top surface 18 positioned so as to make contact with the negative double-bladed contacts 9 of the next row of shingles. Top layer 18 can have graphic elements 5 and 5A and adhesive 6 on its surface.

Figure 10:
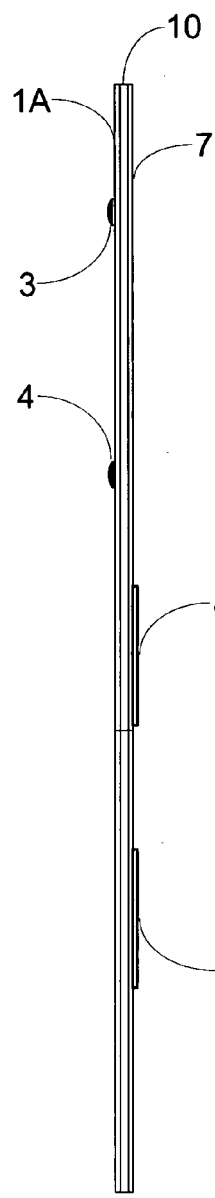
FIG. 10 shows a typical continuous band end cap.

FIG. 10 illustrates a continuous band end cap 33.

Figure 11:
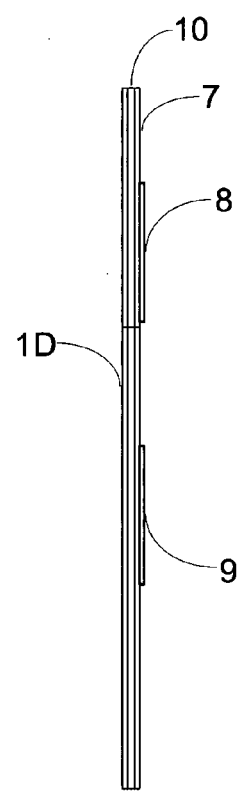
FIG. 11 shows a typical shingle side view.

FIG. 11 illustrates the side view of a standard shingle unit showing the wire contacts 3 and 4 on the surface of top layer 1A and the double-bladed contacts 8 and 9 on the surface of bottom layer 7. Left and right side shingle units have the identical side view.

Figure 12:
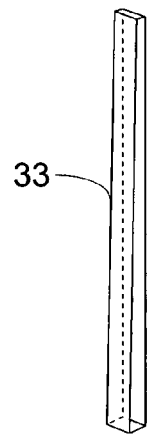
FIG. 12 shows a typical "top row" shingle side view.

FIG. 12 illustrates the side view of a standard top row shingle unit showing the double-bladed contacts 8 and 9 on the surface of bottom layer 7. Top left and top right side shingle units have the identical side view.

Figure 13:
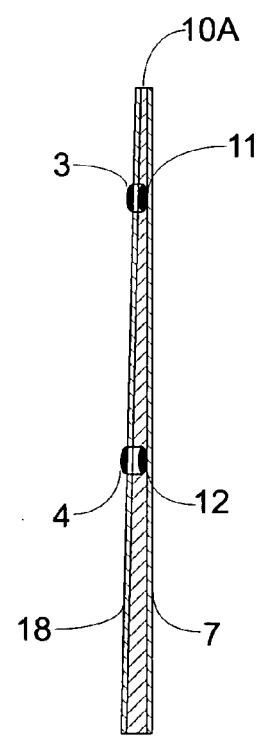
FIG. 13 shows a continuous starting course band side view cutaway.

FIG. 13 illustrates a cross section of the continuous starting course band showing the wire contacts 3 and 4 on the surface of top layer 18 and the embedded wires 11 and 12 between top layer 18 and bottom layer 7.

Figure 14:
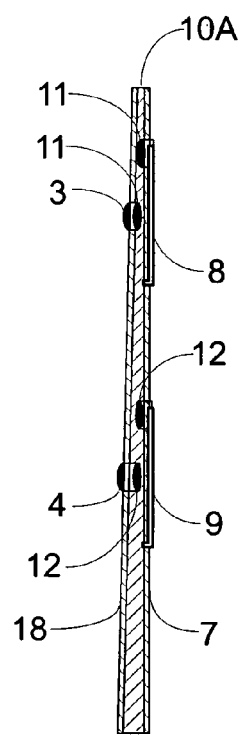
FIG. 14 shows a continuous dividing band side view cutaway.

FIG. 14 illustrates a cross section of the continuous dividing band showing the wire contacts 3 and 4 on the surface of top layer 18 with their respective embedded wires 11 and 12 and double-bladed contacts 8 and 9 on the surface of bottom layer 7 with their respective embedded wires 11 and 12 between top layer 18 and bottom layer 7. Though all wire contacts 3 and 4 align with double-bladed contacts 8 and 9 in the top view shown in FIG. 9, they are offset and isolated from each other in profile as shown in FIG. 13 so as to keep the two zones that the top and bottom surfaces make contact with separated from each other. The spacer layer 10A may be cast with wires 11 and 12 embedded in it to insure isolation of parallel wires and overlapping contact points.

FIG. 15 illustrates an exploded view of a standard shingle unit's tab.

Figure 16:
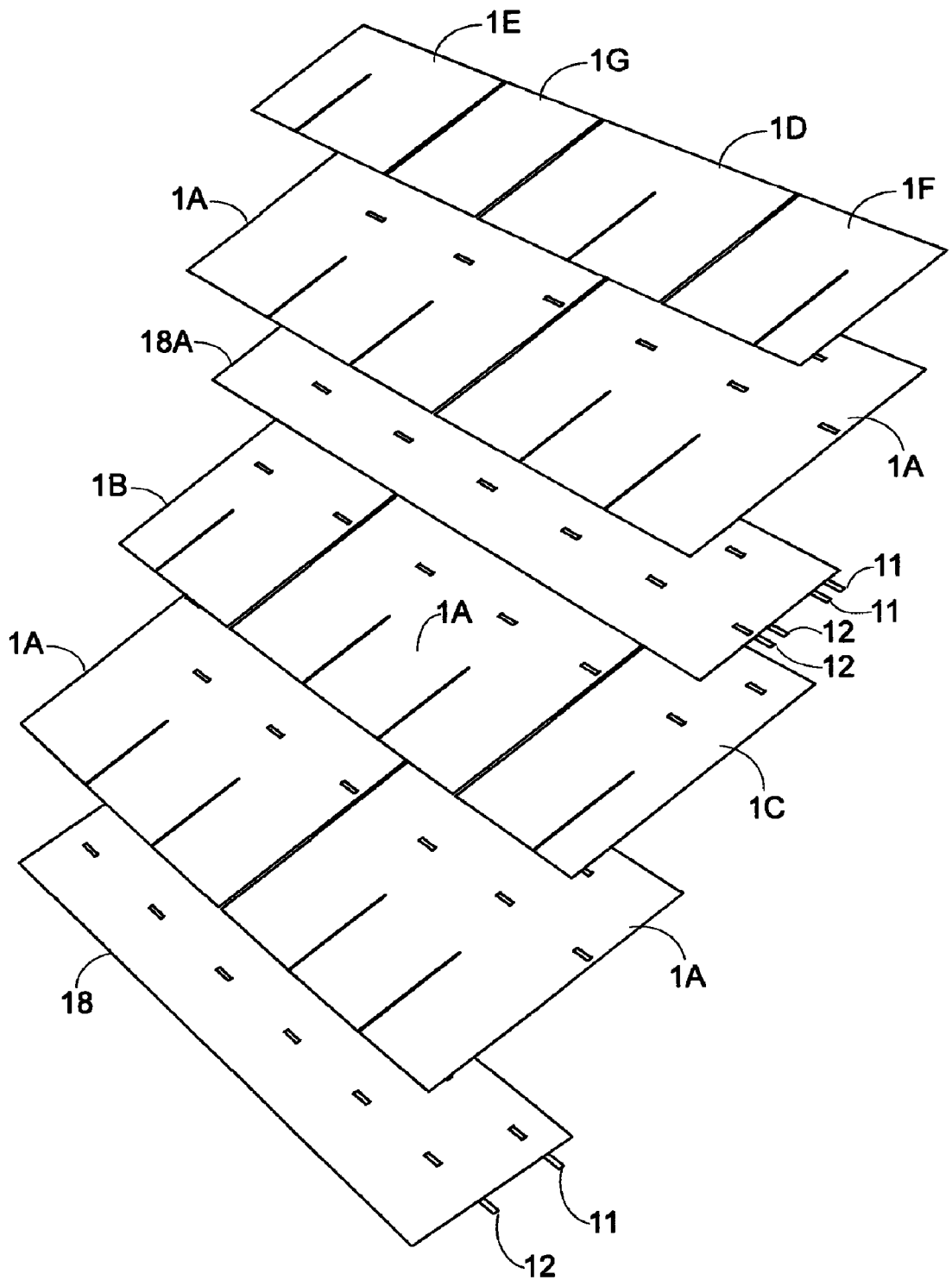
FIG. 16 shows the orientation of various shingle unit shapes to each other.

FIG. 16 illustrates the relationship between the various shingle units as they would be installed on a typical roof. For simplicity, this view omits any standard tabs cut apart or any non-photovoltaic filler shingles.

Figure 17:
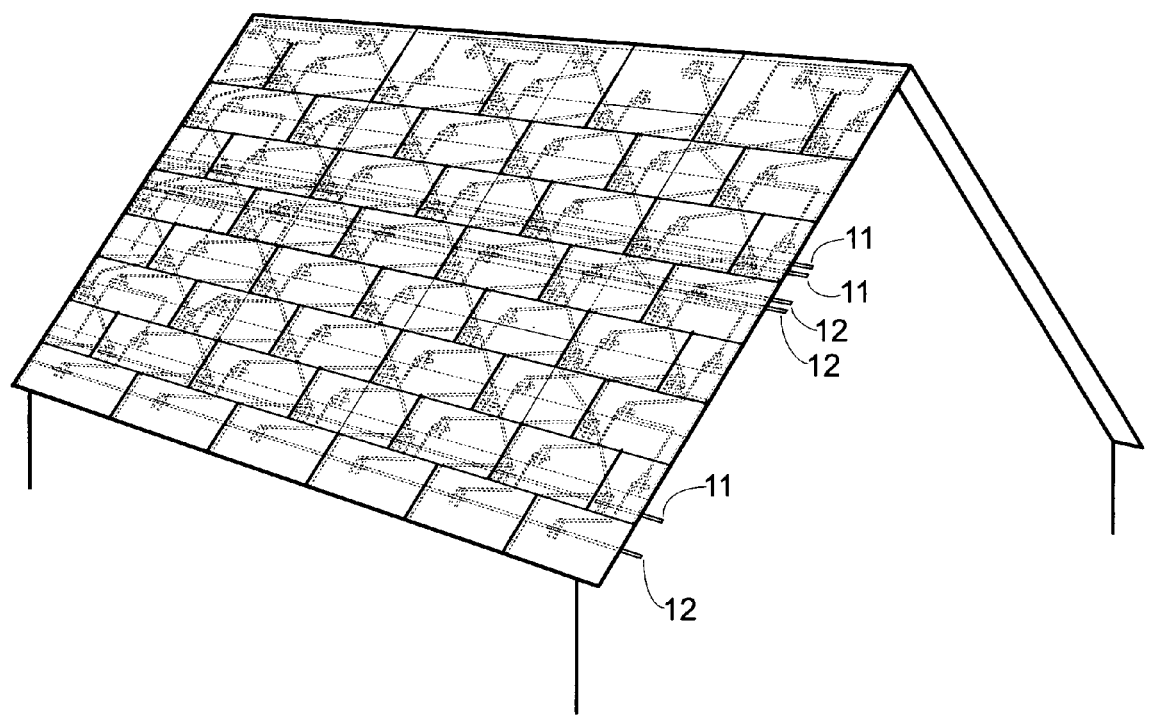
FIG. 17 shows the electrical connectivity of the various shingle units in an installed roof surface.

FIG. 17 illustrates the electrical connectivity of the various shingle units in an installed roof surface. For simplicity, this view omits any non-photovoltaic filler shingles.

FIG. 18 illustrates an alternative hook & loop electrical connection which includes hooks 22 and loops 23. Either hooks 22 or loops 23 or both could be attached to fusible links 34 as shown and previously referenced in FIG. 1C, or they may also behave as fusible links 34.

FIG. 19 illustrates an alternative interlocking mushroom cluster electrical connection 24. Interlocking mushroom cluster electrical connection 24 could also behave as fusible links 34 referenced in FIG. 1C.

FIG. 20 illustrates a preferred embodiment of a pre-positioned fastener assembly 36 which includes a fastener tab 25, a fastener 26, and possibly a torsion spring 27. Fastener 26 can be fabricated from stamped or cast non-corrosive metal. Fastener 26 can feature a barbed point and wings at the top bent to a "T" shape which provides an element for the fastener tab 25 to hold onto, provides a flat surface to hammer against, and provides an element that will hold down the shingle once the fastener 26 is hammered into a seated position. Fastener tab 25 can be made from nylon or some other thin, flexible, material which is secured to the shingle mounting section along strip 28. Either strip 28 can be a non-aggressive adhesive or fastener tab 25 can have a perforation that would allow the installer to tear the fastener assembly 36 away in instances when the shingle tabs are to be cut apart. Fastener tab 25 has a pair of symmetrical elongated slots 35 at the front end cut through to the outside edges at the back of the slots which hold the wings of fastener 26. The cuts at the back of the slots allow the wings of the fastener 26 to slip out of the slots when the fastener 26 is hammered into place, thus allowing the fastener tab 25 to lay flat over the seated fastener 26. A torsion spring 27 may be fixed between the fastener tab 25 and the fastener 26 so as to make the fastener 26 pop into position when the shingle is un-stacked. Torsion spring 27 must expand to the proper angle to raise the fastener 26 perpendicularly to the shingle mounting section. The tip of fastener 26 can be captured in a locating slot 29 in the shingle mounting section that has an elongated shape in order to receive the coil of the torsion spring 27 when the fastener 26 is hammered into place.

An alternate version of this shingle system could instead inverse the position of all positive and negative connections and contacts or otherwise reverse the polarity of the system.

It will be appreciated by those skilled in the art that changes and modifications may be made to the above described embodiments without departing from the inventive concept thereof. It is understood, therefore, that the present invention is not limited to particular embodiments disclosed, but is intended to include all modifications and changes which are within the scope and spirit of the invention as defined by the appended claims.

What is claimed is:

1. A solar roofing shingle system including continuous bands housing positive and negative electrical leads that span across and make contact with multiple shingles, said bands dividing groups of shingles into isolated electrical zones, and shingles having top and bottom faces with electrical contacts and tab sections and mounting sections, said tab sections having a plurality of slots forming a plurality of tabs, said tabs having photovoltaic devices, said solar roofing shingle system including a variety of shingle shapes needed to create flush roof edges, said shingles having positive and negative electrical leads from said photovoltaic devices extending to positive and negative electrical contacts on said shingle faces positioned such that when a plurality of said shingles are secured in rows staggered by one half tab width in a by any known method to form a shingled roof, said positive electrical contacts of one row align with said positive electrical contacts of the next row and said negative electrical contacts of said one row align with said negative electrical contacts of said next row to form positive and negative electrical connectivity among said shingles of said solar roofing shingle system, said electrical connectivity made redundant by positive and negative electrical connectivity along roof edges and continuous bands in addition to positive electrical connections made diagonally from row to row in one direction across the roof and negative electrical connections made diagonally from row to row in the direction substantially perpendicular to said one direction with all positive and negative electrical connections terminating at said continuous bands.

2. A solar roofing shingle system according to claim 1 wherein one of said variety of shingle shapes is a standard shingle unit having a plurality of said tabs of identical size and proportion and a mounting section substantially as tall as the tab section, said standard shingle unit having positive and negative terminals attached to each photovoltaic device of said standard shingle unit from which are attached contacts for each terminal exposed on the bottom face of the shingle, said standard shingle unit also having enclosed electrical connectivity between said terminals and contacts exposed on the top face of the mounting section.

3. A solar roofing shingle system according to claim 1 wherein one of said variety of shingle shapes is a left roof edge shingle unit having a plurality of tabs, the left most-tab being diminished in width, said left roof edge shingle having positive and negative terminals attached to each photovoltaic device of said left roof edge shingle unit, and enclosed positive and negative electrical connectivity between the left-most tab and its adjacent tab, wherein one electrical connection includes a contact on the bottom face of the mounting section above said left-most tab, a contact on the bottom face of the mounting section above said adjacent tab, and a contact on the top face of the mounting section in the region above said adjacent tab, and the other electrical connection includes a contact on the bottom face of said adjacent tab, a contact on the top face of the mounting section in the region above said adjacent tab, and a contact on the top face of the mounting section in the region above said left-most tab.

4. A solar roofing shingle system according to claim 1 wherein one of said variety of shingle shapes is a right roof edge shingle unit having a plurality of tabs, the right most-tab being diminished in width, said right roof edge shingle having positive and negative terminals attached to each photovoltaic device of said right roof edge shingle unit, wherein there is enclosed positive and negative electrical connectivity between the right-most and its adjacent tab, wherein one electrical connection includes a contact on the bottom face of said right-most tab, a contact on the bottom face of said adjacent tab, and a contact on the top face of the mounting section in the region above said adjacent tab, and the other electrical connection includes a contact on the bottom face of the mounting section above said adjacent tab, a contact on the top face of the mounting section in the region above said adjacent tab, and a contact on the top face of the mounting section in the region above said right-most tab.

5. A solar roofing shingle system according to claim 1 wherein one of said variety of shingle shapes is a standard top row shingle unit having a plurality of said tabs of identical size and proportion and a mounting section diminished in height, said top row shingle having positive and negative terminals attached to each photovoltaic device of said standard top row shingle unit from which are attached contacts for each terminal exposed on the bottom face of the shingle, said standard top row shingle unit having enclosed positive and negative electrical connectivity among all said photovoltaic devices.

6. A solar roofing shingle system according to claim 1 wherein one of said variety of shingle shapes is a top row left edge shingle unit having a plurality of tabs, the left-most tab being diminished in width, and a mounting section diminished in height, said top row left edge shingle having positive and negative terminals attached to each photovoltaic device of said top row left edge shingle unit, said top row left edge shingle having enclosed positive and negative electrical connectivity among all photovoltaic devices, all said terminals except one terminal of the left-most photovoltaic device having a contact exposed on the bottom face of said top row left edge shingle unit.

7. A solar roofing shingle system according to claim 1 wherein one of said variety of shingle shapes is a top row right edge shingle unit having a plurality of tabs, the right-most tab being diminished in width, and a mounting section diminished in height, said top row right edge shingle having positive and negative terminals attached to each photovoltaic device of said top row right edge shingle unit, said top row right edge shingle having enclosed positive and negative electrical connectivity among all photovoltaic devices, all said terminals except one terminal of the right-most photovoltaic device having a contact exposed on the bottom face of said top row right edge shingle unit.

8. A solar roofing shingle system according to claim 1 wherein one of said variety of shingle shapes is a single top row shingle unit having one tab and a mounting section diminished in height, said top row shingle unit having a positive and a negative terminal on the bottom face of said single top row shingle unit.

9. A solar roofing system according to claim 1 wherein one of said bands is a continuous starting course band that is at least as tall as the shingle tabs and houses enclosed positive and negative wires that emerge intermittently as exposed contacts on its top face so as to align with contacts on the bottom face of shingles that overly said continuous starting course band.

10. A solar roofing system according to claim 1 wherein one of said bands is a continuous dividing band that is at least as tall as the shingle tabs and houses two isolated sets of enclosed positive and negative wires wherein one of said sets of positive and negative wires emerge intermittently as exposed contacts on the top face of said continuous dividing band so as to align with contacts on the bottom face of shingles that overly said continuous dividing band, and the other set of positive and negative wires attach to intermittent contacts on the bottom face of said continuous dividing band so as to align with contacts on the top face of shingles which said continuous dividing band overlays.

11. A solar roofing system according to claim 1 wherein at least some electrical contacts are in the form of blades.

12. A solar roofing system according to claim 1 wherein at least some electrical contacts are in the form of exposed wire against substantially perpendicular oriented blades.

13. A solar roofing system according to claim 1 wherein electrical contacts are in the form of interlocking hook and loop wire.

14. A solar roofing system according to claim 1 wherein electrical contacts are in the form of interlocking mushroom shapes.

15. A solar roofing system according to claim 1 wherein said electrical contacts are coated in a fusible metal alloy.

16. A solar roofing system according to claim 1 wherein said positive electrical connectivity and said negative electrical connectivity within at least some of said shingles and said bands includes fusible links.

17. A solar roofing system according to claim 1 wherein at least some of said shingles and bands have adhesive on their faces that seals electrical contacts and secures components to each other.

18. A solar roofing system according to claim 1 wherein at least some of said shingles and bands have graphic elements on their top surfaces indicating acceptable areas to be pierced by fasteners and areas that can be cut during installation.

19. A solar roofing system according to claim 1 and further including a shingle unit not having photovoltaic devices or related wiring or contacts, said shingle unit to be used in conjunction with photovoltaic shingles on areas of roof that require cuts to accommodate miscellaneous holes, odd angles, odd ridges, or intersecting valleys.

20. A solar roofing shingle system according to claim 1 having removable release paper on the shingle tabs that block out the photovoltaic devices and render them electrically inactive during installation.

21. A solar roofing system according to claim 1 having magnetized components to assist in alignment during installation.

22. A solar roofing shingle system including a continuous band of positive and negative electrical leads secured along one edge of the roof and shingles having top and bottom faces and tab sections and mounting sections, said tab sections having a plurality of cuts forming a plurality of tabs, said tabs having photovoltaic devices mounted on their top face, said solar roofing shingle system including a variety of shingle shapes needed to create flush roof edges, said shingles having positive and negative leads from said photovoltaic devices extending through said shingles to positive and negative contacts on said shingle faces positioned such that when a plurality of said shingles are secured in rows staggered by one half tab width by any known method to form a shingled roof, said positive contacts of one row of said tabs align with said positive contacts of the next row and said negative contacts of said one row of tabs align with said negative contacts of said next row to form positive and negative electrical connectivity among all said shingles of said solar roofing shingle system, said connectivity made redundant by positive and negative connectivity along all roof edges in addition to positive connections made diagonally from row to row in one direction across the roof and negative connections made diagonally from row to row in a direction substantially perpendicular to the positive connections across the roof with all positive and negative connections terminating at said continuous band.

23. A solar roofing system according to claim 22 wherein all positive contacts are vertically staggered.

* * * * *